(12) United States Patent
Ohkawa et al.

(10) Patent No.: US 6,972,662 B1
(45) Date of Patent: Dec. 6, 2005

(54) RFID (RADIO FREQUENCY IDENTIFICATION) AND IC CARD

(75) Inventors: Takehiro Ohkawa, Tachikawa (JP); Miki Yuyama, Minamitsuru-gun (JP); Hiroshi Yoshigi, Nishitama-gun (JP); Tadashi Oonishi, Musashimurayama (JP); Kazuki Watanabe, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 448 days.

(21) Appl. No.: 09/639,753

(22) Filed: Aug. 15, 2000

(30) Foreign Application Priority Data

Mar. 7, 2000 (JP) .............................. 2000-067141

(51) Int. Cl.$^7$ .............................................. H04Q 5/22
(52) U.S. Cl. .................. 340/10.1; 340/10.34
(58) Field of Search ........................... 340/10.1, 10.34, 340/10.42, 10.33

(56) References Cited

U.S. PATENT DOCUMENTS

| | | | |
|---|---|---|---|
| 4,333,072 A | * | 6/1982 | Beigel ..................... 340/10.34 |
| 4,857,893 A | * | 8/1989 | Carroll ..................... 340/572.7 |
| 5,153,583 A | * | 10/1992 | Murdoch .................. 340/10.34 |
| 5,430,441 A | * | 7/1995 | Bickley et al. ............. 340/10.2 |
| 5,521,590 A | * | 5/1996 | Hanaoka et al. .......... 340/10.51 |
| 5,793,305 A | * | 8/1998 | Turner et al. ............. 340/10.34 |
| 5,973,598 A | * | 10/1999 | Beigel ..................... 340/572.1 |
| 6,246,624 B1 | * | 6/2001 | Hirano et al. ............... 365/226 |

FOREIGN PATENT DOCUMENTS

| | | |
|---|---|---|
| JP | 8-30752 | 2/1996 |
| JP | 10-207580 | 8/1998 |

* cited by examiner

*Primary Examiner*—Brian Zimmerman
*Assistant Examiner*—Clara Yang
(74) *Attorney, Agent, or Firm*—Mattingly, Stanger, Malur & Brundidge PPC

(57) ABSTRACT

An RFID which provides a wide working voltage range and general versatility at low cost, without the need for changing its internal circuit design due to external factors. In the RFID, there is provided an arrangement that a low impedance state is given when its internal data communication circuit is in a reset state.

12 Claims, 6 Drawing Sheets

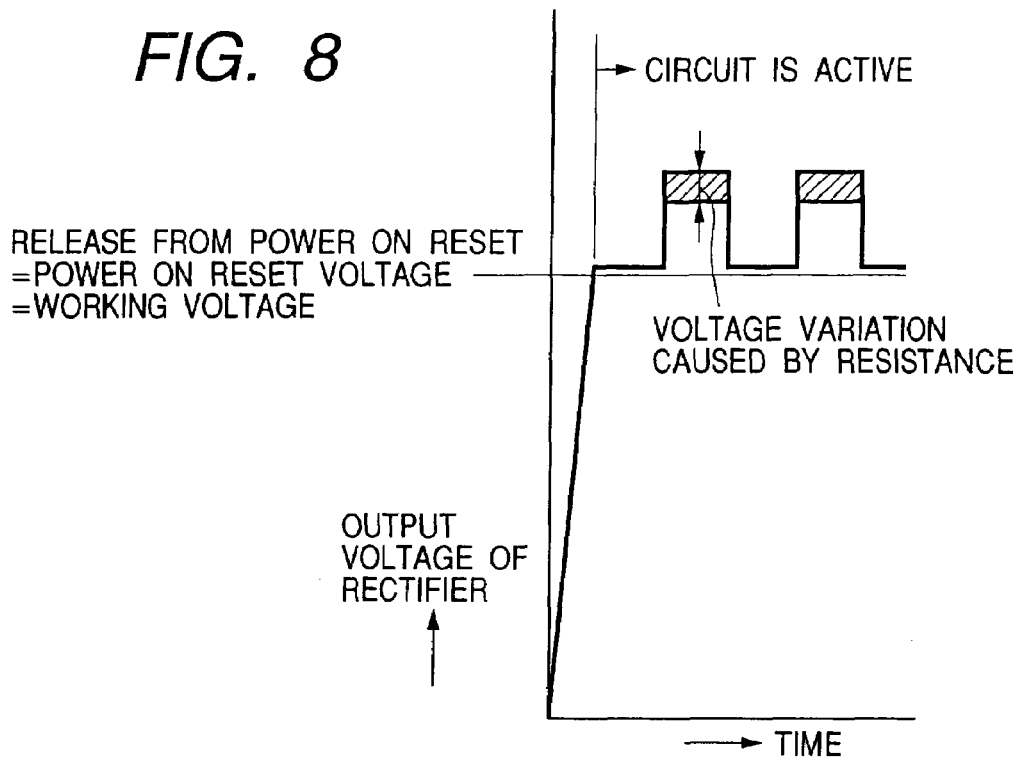
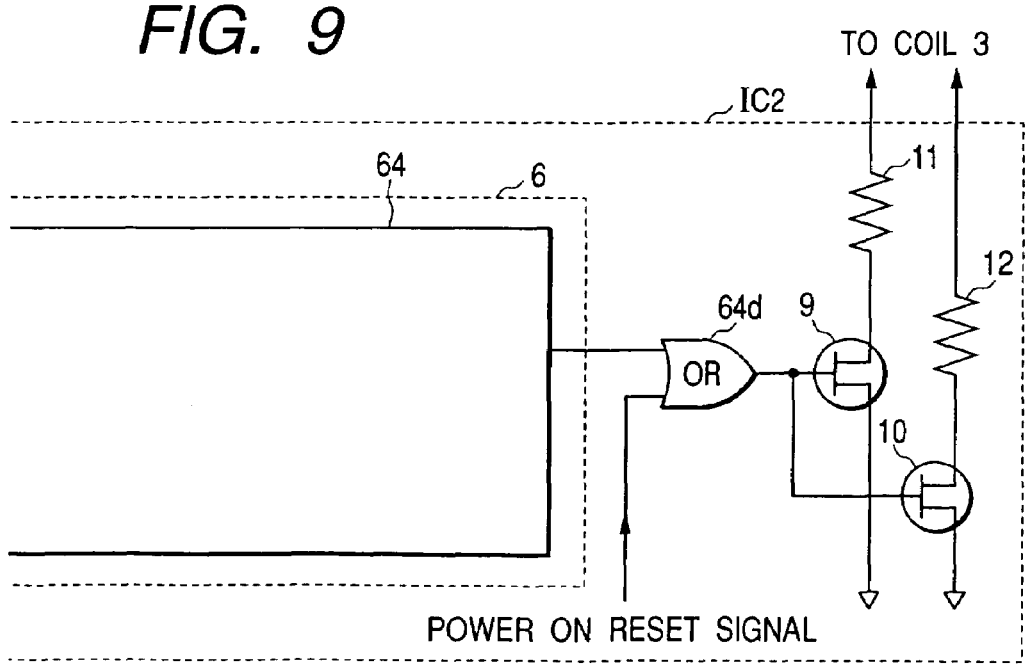

RFID (RADIO FREQUENCY IDENTIFICATION) AND IC CARD

BACKGROUND OF THE INVENTION

The present invention relates to a radio frequency identification (RFID) and an IC card for the RFID, and more particularly to an RFID and a contactless IC card containing the same for receiving power and information from an external apparatus and for transmitting information to the external apparatus on a contactless basis.

An RFID is used as a tag, for example, and an IC card is a kind of the RFID.

In a conventional RFID such as contactless IC card and the like in which power is received from an external apparatus and signals are interchanged with the external apparatus on a contactless basis, an AC wave received by an antenna coil is rectified and smoothed and then supplied to internal circuits through a series regulator. Recently, however, for the purpose of widening a working voltage margin, there has also been used a method of supplying power only by providing a limiter circuit for high voltage resistant protection after rectification and smoothing, without using a series regulator in which a voltage loss is inevitable.

As a power-on-reset circuit for maximizing a working voltage margin, it is common practice to use a hysteresis circuit having a two-stage structure wherein, for countermeasure to dynamic load variation by internal circuits, a reset voltage is given at a level of a logic working guarantee voltage in a steady state and the sum of the logic working guarantee voltage and a voltage for compensating for a voltage drop due to dynamic load variation is used as a power-on-reset release voltage. This circuit scheme is disclosed in Japanese Patent Laid-open (Kokai) No. Hei 10-207580, for example. Further, in Japanese Patent Laid-open (Kokai) No. Hei 8-30752, there is disclosed a circuit arrangement of a contactless IC card using a series regulator wherein, for compensating for a voltage drop in operation of a CPU contained in the IC card, a dummy load corresponding to a CPU operation load is applied before release of power-on-resetting and the dummy load is removed at the time of release of power-on-resetting.

SUMMARY OF THE INVENTION

The above-mentioned circuit arrangement disclosed in Japanese Patent Laid-open (Kokai) No. Hei 8-30752 is disadvantageous in that there is difficulty in application to RFID in which dynamic impedance variation by such means as intermittent load operation is used for communication from an IC card to an external apparatus (this kind of technique is defined in ISO 10536 and ISO 14443). Although it is possible to apply this circuit arrangement to RFID by superimposing a communication load on the dummy load, there arises a problem that the dummy load must be redesigned according to design changes in load for communication and design changes in antenna coil. Further, the dummy load must be set to have a value inclusive of upper limits of individual CPU difference, individual communication load difference, and impedance variation with temperature, resulting in a problem that a startup receiving power level higher than an operational receiving power level is required. Moreover, the complexity of this circuit arrangement gives rise to a problem of an increase in cost.

As noted above, for communication to an external apparatus defined in ISO 10536 and ISO 14443, there is a technique of dynamic impedance variation by such means as intermittent load operation. In implementation of RFID using this technique, a reset release voltage used in a hysteresis power-on-reset circuit such as disclosed in Japanese Patent Laid-open (Kokai) No. Hei 10-207580 must be set to have a value corresponding to the sum of a working guarantee voltage and a drop-down voltage inclusive of an upper limit of individual communication load difference (inclusive of impedance variation with temperature) resulting in a problem that a margin of a startup voltage is narrowed. Further, with a design change in load for communication or a change in impedance related with a transmission system connected from an IC card to an external apparatus, e.g., with a design change in antenna coil, it is inevitable to redesign a power-on-reset release voltage. Still further, there arises a problem of an increase in circuit complexity.

In a contactless IC card defined in ISO 10536 and ISO 14443, an AC wave received by an antenna coil is rectified and smoothed to provide power source to internal elements of an IC, and communication with an external apparatus is carried out by varying a load on the IC. Thus, a variation width of a power supply voltage of the IC is rather large. Therefore, the power supply voltage is monitored at all times to check whether or not it is within a working guarantee range of the IC. If the power supply voltage is within the working guarantee range, a reset state imposed on the IC is released to operate internal circuits thereof. In this scheme, a hysteresis circuit configuration of a two-stage type is provided in which a reset voltage is given at a working guarantee voltage level and the sum of the reset voltage and a voltage drop due to dynamic load variation is used as a reset release voltage. This condition is a cause of reducing a working voltage margin of the IC.

As described above, in conventional contactless IC cards and RFIDs, the settings of a dummy load and a reset release voltage involve external factors, causing a disadvantage of the lack of general versatility and a difficulty in ensuring a maximum of a working voltage range.

It is therefore an object of the present invention to obviate the above-mentioned disadvantages by providing an RFID, using dynamic impedance variation by such means as intermittent load operation for communication to an external apparatus defined in ISO 10536 and ISO 14443, wherein, when a data communication circuit of the IC is in a reset state, the IC is put in a low impedance state for communication, and wherein, when a coupling force between the external apparatus and the RFID is equivalent to or higher than that at release of resetting, a reset action is not performed at the time of voltage drop due to impedance variation as a method of communication after release of resetting.

Although the present invention will be described in detail as related to an IC card, it is to be understood that the present invention is applicable to other implementation forms of RFID. In the following detailed description of the preferred embodiments, an IC card containing a microprocessor will be taken as an example. In addition, an IC card comprising logic elements without using a microprocessor is also within the scope of the present invention. Furthermore, while a contactless IC card having an antenna will be discussed in the following detailed description, the present invention is applicable to a contact-type IC card and a contactless IC card having no antenna.

The above and other objects, features and advantages of the present invention will become more apparent from the following detailed description with reference to the accompanying drawings.

BRIEF DESCRIPTION OF THE DRAWINGS

FIG. 8 is a diagram for detailed description of DC power voltage variation in connection with the timing chart shown in FIG. 7; and FIG. 9 is a diagram showing a modulator part in an IC in another preferred embodiment of the present invention.

DETAILED DESCRIPTION OF THE PREFERRED EMBODIMENTS

The present invention will now be described in detail by way of example with reference to the accompanying drawings.

Embodiment 1

A configuration and circuit operations of a contactless IC card as a form of RFID will first be described below.

Figure 1:
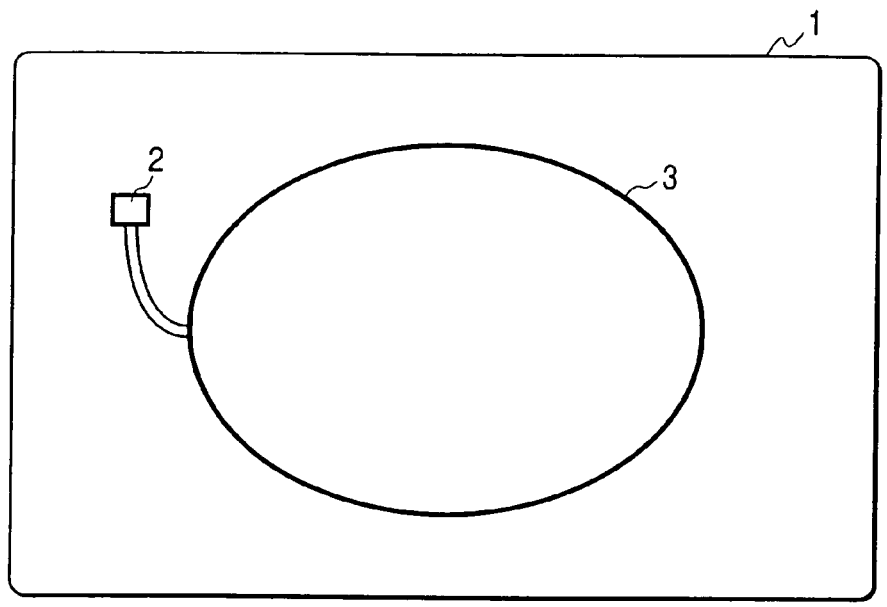
FIG. 1 is a diagrammatic illustration showing a part mounting arrangement on an IC card.

FIG. 1 presents a general configuration of the contactless IC card. In this figure, there is shown a plan view of a part mounting arrangement on a card base material with a surface layer removed. An IC chip 2 is connected with an antenna coil 3 on an IC card 1.

Figure 2:
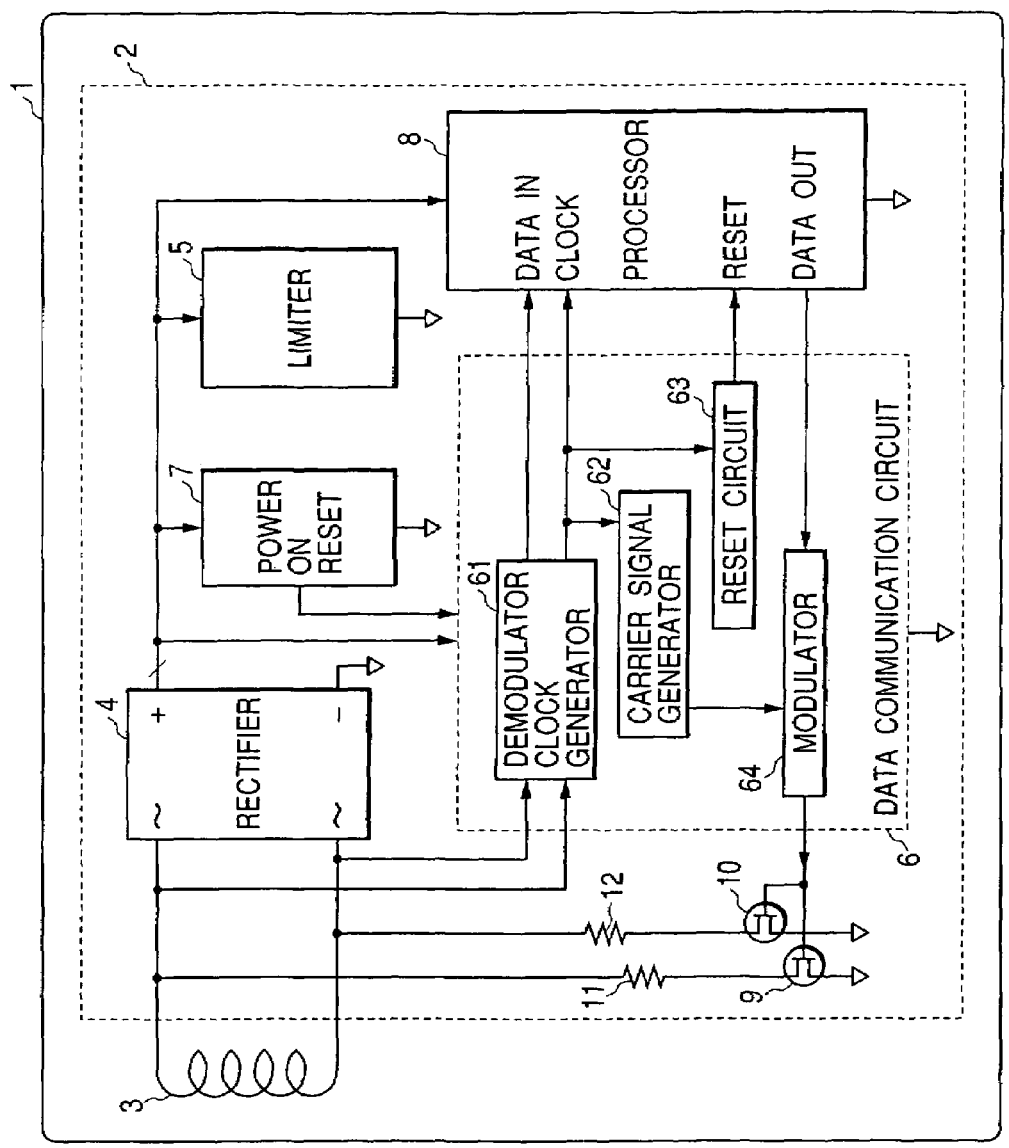
FIG. 2 is an IC card circuit block diagram.

FIG. 2 presents a general configuration of circuit blocks of the contactless IC card. The circuit block configuration shown in this figure is applicable to implementation of the present invention. Note, however, that an internal structure of a power-on-reset circuit 7 in the present invention is different from those in conventional techniques.

Referring to FIG. 2, power is received from an external apparatus through the antenna coil 3 contained in the IC card 1. For information interchange with the external apparatus, contactless coupling operations are performed as described below.

An AC wave having a predetermined frequency, received by the antenna coil 3 from the external apparatus, is converted into DC power through a rectifying-smoothing circuit 4 in the IC chip 2. Then, at a DC voltage level corresponding to an upper limit imposed by a limiter circuit 5 for over-voltage protection, the DC power is supplied to each internal circuits. Meanwhile, with the AC wave received by the antenna coil 3, it is detected that the DC voltage is higher than a voltage level predetermined for the power-on-reset circuit 7. Under this condition, each circuit in a data communication circuit 6 is released from a reset state to enter an active state. The AC wave received by the antenna coil 3 is fed to a demodulator-clock generator circuit 61, which then generates a clock signal to a processor 8. Using the clock signal thus generated, a reset circuit 63 produces a reset signal for activating the processor 8 with predetermined timing. Thus, the processor 8 is supplied with the reset signal. Information from the external apparatus is received by the IC card 1 through phase modulation of an AC wave. Then, the phase-modulated AC wave is demodulated by the demodulator—clock generator circuit 61, and demodulated information is supplied to the processor 8. A carrier signal used for information transmission from the IC card 1 to the external apparatus is generated by a carrier signal generator circuit 62 which divides a frequency of the clock signal to a predetermined frequency. The carrier signal is phase-modulated with data signal from the processor 8 by a modulator 64. FETs 9 and 10 are switched by an output of the modulator 64 to intermittently turn on-off resistors 11 and 12 disposed between terminals of the antenna coil 3 and circuit ground, thereby producing impedance variation in the IC chip 2. That is to say, through the use of the carrier signal phase-modulated with the data signal, dynamic impedance variation is produced in the IC card 1. Detecting the dynamic impedance variation by the carrier signal in the IC card 1, the external apparatus performs phase demodulation to attain information signals from the IC card 1.

Figure 3:
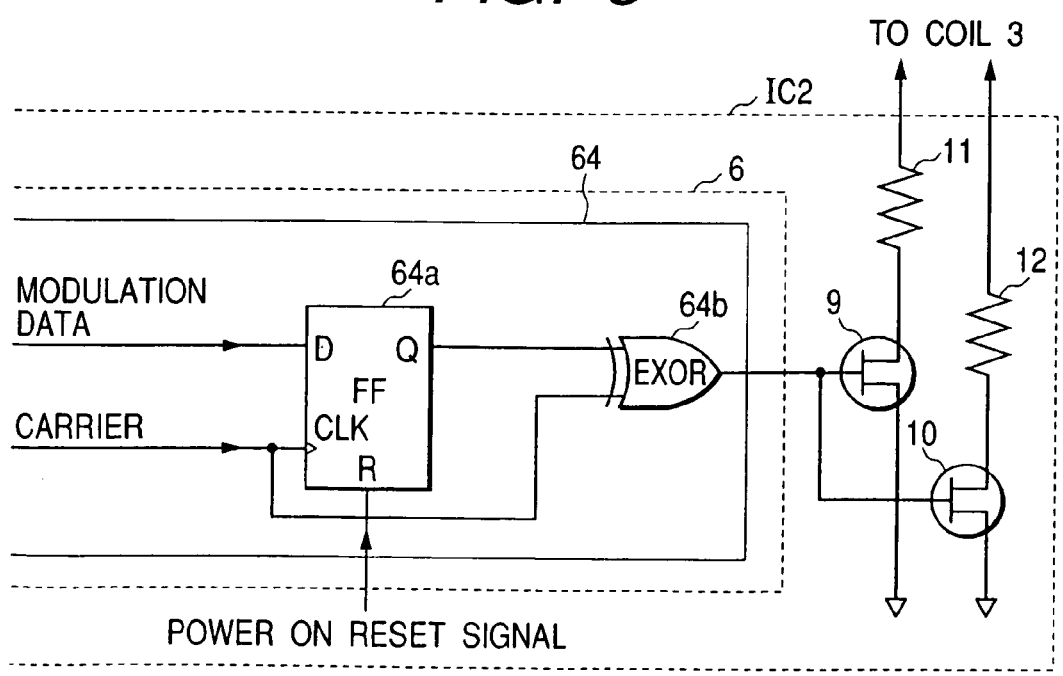
FIG. 3 is a diagram showing a reference example of a modulator part in an IC.
Figure 4:
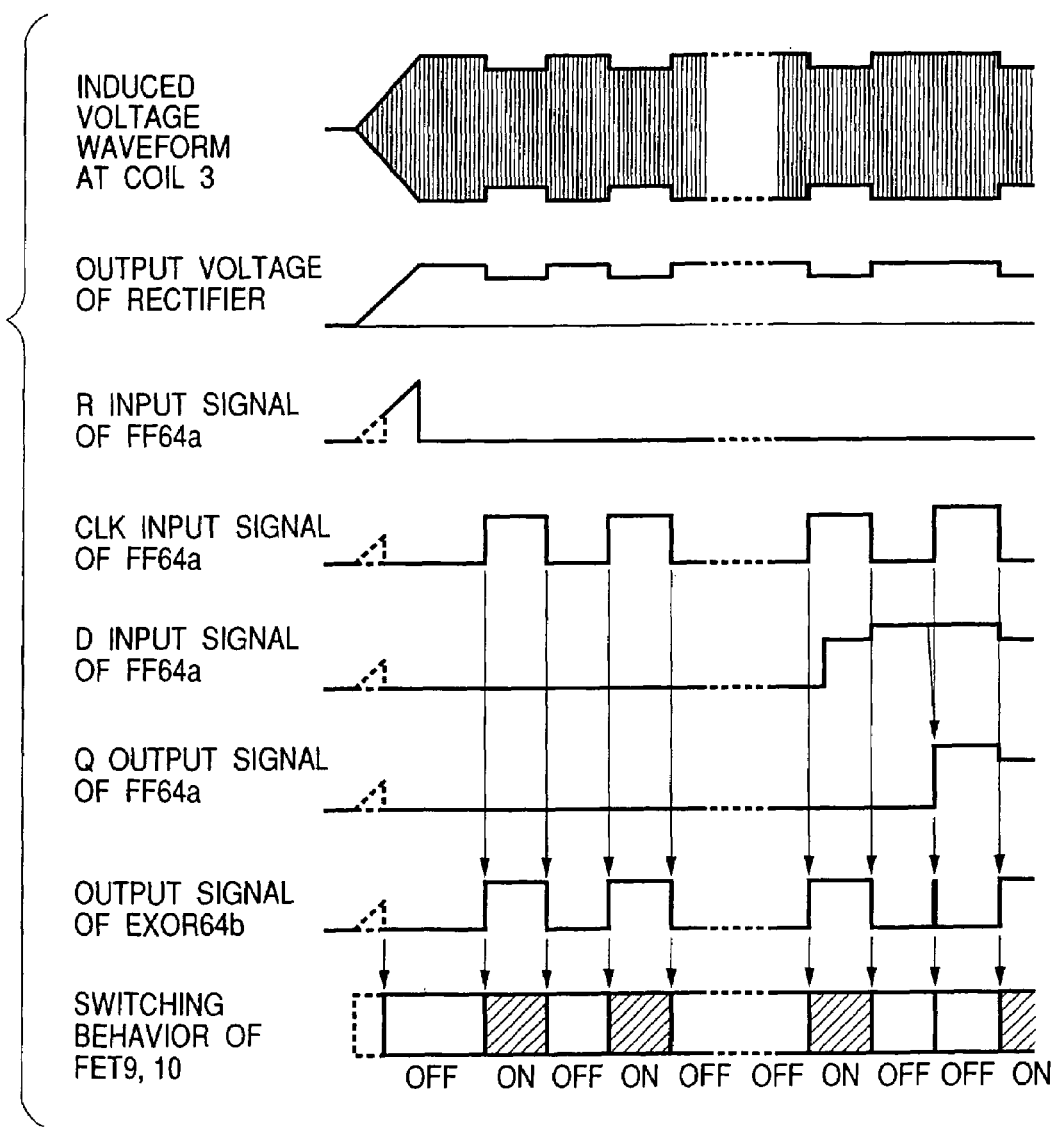
FIG. 4 is an operation timing chart of each part in the circuit structure shown in FIG. 3.
Figure 5:
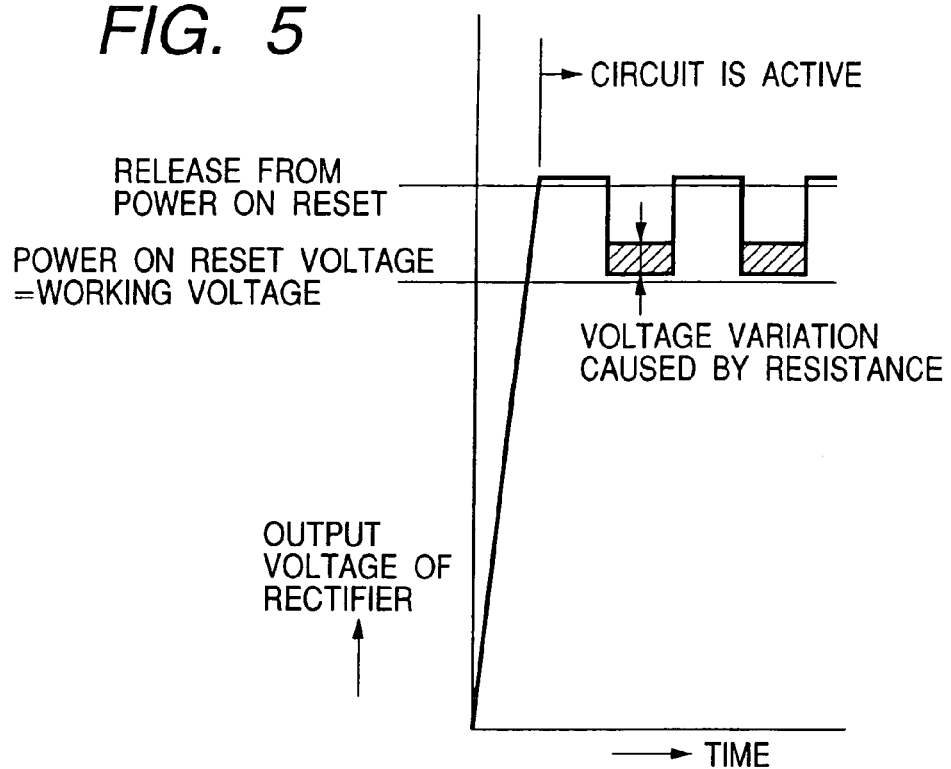
FIG. 5 is a diagram for detailed description of DC power voltage variation in connection with the timing chart shown in FIG. 4.

Then, using FIGS. 3, 4 and 5, the following describes operations of a reference example of a modulator 64 and peripheral circuits thereof.

FIG. 3 shows a detailed structure of the modulator 64 and an impedance control circuit in a reference example. In this example, it is inevitable to employ a power-on-reset circuit having a hysteresis characteristic.

When a DC power supply voltage reaches a predetermined reset release voltage level, a power-on-reset signal from the power-on-reset circuit 7 connected with an R (reset input) terminal of a flip-flop 64a is made to have a low level, causing the flip-flop 64a to be put in an active state.

The carrier generator circuit 62 is also put in active state to generate a carrier signal. The carrier signal thus generated is applied to a CLK (clock input) terminal of the flip-flop 64a and an input terminal of an exclusive-OR circuit 64b. The other input terminal of the exclusive-OR circuit 64b is connected with a Q (output) terminal of the flip-flop 64a, and an output terminal of the exclusive-OR circuit 64b is connected with gate terminals of the FETs 9 and 10 used as switching elements. At a point of time when an input to the CLK terminal is changed from a low level to a high level, the flop—flop 64a operates so that a level state of a data signal from the processor 8 connected with a D (data input) terminal is output through the Q terminal. Therefore, until a change occurs in the data signal, the Q terminal remains at a low level, and the carrier signal is fed in intact state to the output terminal of the exclusive-OR circuit 64b. In a state that the data signal has a high level, an inverted signal of the carrier signal is output through the output terminal of the exclusive-OR 64b. Consequently, according to a level of the data signal, the modulator 64 acts to perform phase inversion in synchronization with the carrier signal.

The FETs 9 and 10 used as switching elements turn on when a gate input level is high, and they turn off when the gate input level is low. Thus, when the FETs 9 and 10 turn on, the resistors 11 and 12 connected with the terminals of the antenna coil 3 are grounded to decrease impedance in the IC 2.

FIG. 4 presents an operation timing chart of each part described above in a situation where, after the start of high-frequency AC power supply from the external apparatus, the progress of DC power supply voltage is made up in a condition high-frequency AC power supply voltage slightly exceeding a power-on-reset release voltage.

As can be seen from this timing chart, after release of resetting, a load for communication is intermittently applied to the antenna coil terminals in conventional arrangements. In the power-on-reset circuit, it is required as an indispensable condition to provide a hysteresis characteristic, i.e., a changeover function for selecting a reset release voltage level at the time of power-on or a reset voltage level for guaranteeing operations after release of resetting.

With reference to FIG. 5, the following describes details of operation behavior at the time of a rise of the DC power supply voltage indicated in FIG. 4.

As shown in FIG. 5, a reset release voltage in the power-on-reset circuit must be higher than the sum of a logic working guarantee voltage (a reset voltage after the start of circuit operation) and a drop-down voltage due to a load resistance for communication. The drop-down voltage is given to have a value inclusive of an error in fabrication process of communication load resistors and variation with temperature thereof. That is to say, an IC working range is narrowed due to the characteristic of the power-on-reset circuit as the indispensable condition regardless of effective operability.

Figure 6:
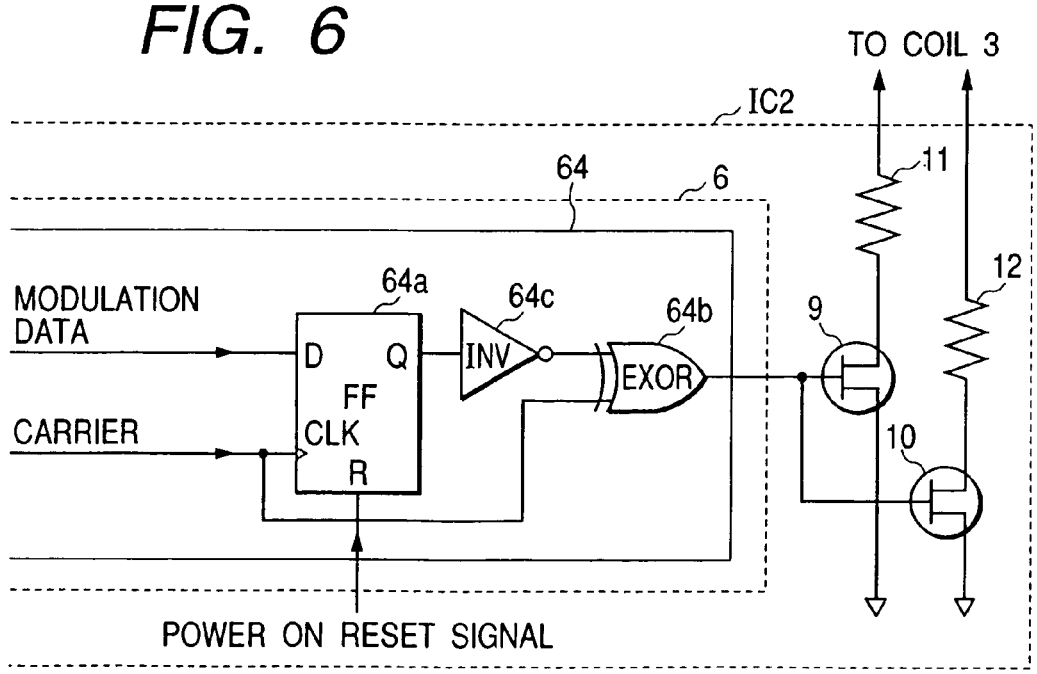
FIG. 6 is a diagram showing a modulator part in an IC in a preferred embodiment of the present invention.
Figure 7:
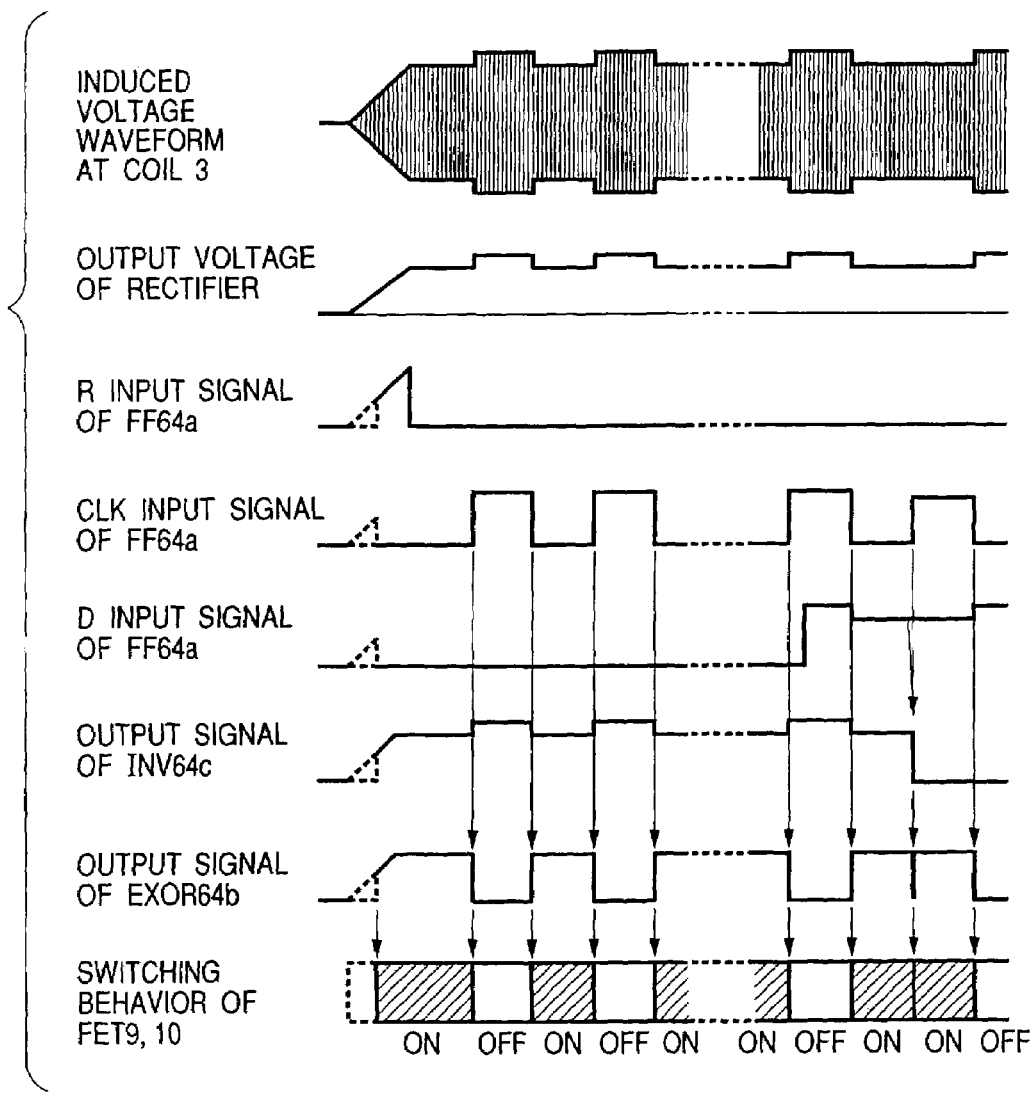
FIG. 7 is a diagram for detailed description of DC power voltage variation in connection with the timing chart shown in FIG. 6.

Then, with reference to FIGS. 6, 7 and 8, the following describes operations of a modulator 64 and peripheral circuits thereof in a preferred embodiment of the present invention.

FIG. 6 shows a detailed structure of the modulator 64 and an impedance control circuit according to the preferred embodiment of the present invention.

In this circuit arrangement, a power-on-reset circuit is so formed that a reset release voltage is equal to a reset voltage after the start of circuit operation, i.e., a simple circuit configuration can be provided.

When a DC power supply voltage reaches a predetermined reset release voltage level, a power-on-reset signal from the power-on-reset circuit 7 connected with an R (reset input) terminal of a flip-flop 64*a* is made to have a low level, causing the flip-flop 64*a* to be put in an active state.

The carrier generator circuit 62 is also put in an active state to generate a carrier signal. The carrier signal thus generated is applied to a CLK (clock input) terminal of the flip-flop 64*a* and an input terminal of an exclusive-OR circuit 64*b*. The other input terminal of the exclusive-OR circuit 64*b* is connected to a Q (output) terminal of the flip-flop 64*a* through an inverter 64*c*, and an output terminal of the exclusive-OR circuit 64*b* is connected with gate terminals of the FETs 9 and 10 used as switching elements. At a point of time when an input to the CLK terminal is changed from a low level to a high level, the flip-flop 64*a* operates so that a level state of a data signal from the processor 8 connected with a D (data input) terminal is output through the Q terminal. Therefore, until a change occurs in the data signal, an output terminal of the inverter 64*c* remains at a high level, and the carrier signal is inverted and fed to the output terminal of the exclusive-OR circuit 64*b*. In a state that the data signal has a high level, the carrier signal is output as it is through the output terminal of the exclusive-OR circuit 64*b*. Consequently, according to a level of the data signal, the modulator 64 acts to perform phase inversion in synchronization with the carrier signal.

The FETs 9 and 10 used as switching elements turn on when a gate input level is high, and they turn off when the gate input level is low. Thus, when the FETs 9 and 10 turn on, the resistors 11 and 12 connected with the terminals of the antenna coil 3 are grounded to decrease impedance in the IC 2.

FIG. 7 presents an operation timing chart of each part described above.

As can be seen from this timing chart, the present invention provides a circuit arrangement in which a load for communication is applied to the antenna coil terminals at the time of resetting. In the power-on-reset circuit, it is therefore not required to provide a hysteresis characteristic.

FIG. 8 is a diagram for detailed description of operation behavior at the time of a rise of the DC power supply voltage in the timing chart shown in FIG. 7.

As shown in FIG. 8, a reset release voltage in the power-on-reset circuit is substantially equal to a logic working guarantee voltage (a reset voltage after the start of circuit operation). Therefore, no substantial adverse effect takes place due to an error in fabrication process of communication load resistors, variation with temperature thereof, design modification thereof, design modification of the antenna coil, and impedance variation in a transmission system including the external apparatus. Thus, it is possible to ensure a maximum of a working voltage range in the IC.

Embodiment 2

Referring to FIG. 9, there is shown a partial circuit structure in an IC according to another preferred embodiment of the present invention.

In FIG. 9, the FETs 9 and 10 and the resistors 11 and 12 perform operations as described in the foregoing (explained in description in connection with FIGS. 3 and 7). An OR circuit 64*d* is provided between an output terminal of the modulator 64 in the data communication circuit 6 of the IC 2 as a switch operation signal source and the gate terminals of the FETs 9 and 10. As another input to the OR circuit 64*d*, a power-on-reset signal is applied from the power-on-reset circuit 7. There is provided a circuit arrangement in which an output of the OR circuit 64*d* has a high level when the power-on-reset signal is high regardless of an output level of the modulator 64. Thus, at the time of resetting, the resistors 11 and 12 are grounded to decrease impedance in the IC 2. That is to say, it is not required to provide a hysteresis characteristic in the power-on-reset circuit. A maximum of a working voltage range in the IC can be ensured by establishing a reset level at a circuit working guarantee voltage.

According to the preferred embodiments of the present invention, it is not required to use a complex reset circuit in the IC. Further, only a logic working guarantee voltage is a required condition for establishing a reset voltage level, and there occurs no adverse effect due to impedance variation in the transmission system including the external apparatus. Therefore, an RFID having general versatility higher than conventional RFIDs can be realized at low cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An RFID comprising:
   an antenna for receiving power to drive a semiconductor circuit device and for transmitting and receiving signals; and
   first means for releasing inner elements of said semiconductor device from a reset state which is an inactive state of said inner elements and putting said inner elements in an active state upon detection of a condition that a voltage attained by rectifying an AC wave induced on said antenna is higher than a predetermined voltage level;

wherein, when said reset state is released, information can be transmitted from said antenna to an external apparatus according to signals which are generated in said semiconductor circuit device by controlling two states of impedance of said semiconductor circuit device which are a high impedance state and a low impedance state, and wherein, in said reset state, said impedance is maintained at said low impedance state.

2. The RFID according to claim 1,
wherein a reset release voltage means for releasing said inner elements from said reset state is substantially equal to a logic working guarantee voltage of an IC that is part of said RFID.

3. The RFID according to claim 2,
wherein said reset release voltage for releasing said inner elements from said reset state is equal to a reset voltage for putting said inner elements in said inactive state at the start of logic working of the IC after releasing said reset state.

4. An IC card which has the RFID according to claim 1.

5. An RFID comprising:
an antenna; and
first means for releasing inner elements of said semiconductor device from a reset state which is an inactive state of said inner elements and putting said inner elements in an active state upon detection of a condition that a DC voltage attained by rectifying an AC wave induced on said antenna is higher than a threshold level;

wherein, when said reset state is released, signal transmission from said antenna to an external apparatus can be performed according to signals which are generated in said semiconductor circuit device by controlling two states of impedance of said semiconductor circuit device which are a high impedance state and a low impedance state, wherein, when said DC voltage is lower than said threshold level, said semiconductor circuit device is put in said reset state, and wherein, in said reset state, said impedance is decreased to a low state.

6. An RFID comprising:
an integrated circuit element having memory means, logic processing means, and power-on-reset means for releasing said logic processing means from a reset state which is an inactive state of said logic processing means and putting said logic processing means in an active state; and an antenna for receiving power and signals from an external apparatus and for supplying said power and signals to said memory means and logic processing means;

wherein, when a voltage applied to said power-on-reset means is lower than a threshold level, impedance of said integrated circuit element is maintained at a low state.

7. An RFID comprising:
an integrated circuit element having communication means, a logic circuit and power-on-reset means for releasing said logic circuit tram a reset state which is an inactive state of said logic circuit and putting said logic circuit in an active state; and an antenna for receiving power and signals from an external apparatus and for supplying said power and signals to said communication means and logic circuit;

wherein, when a voltage applied to said power-on-reset means is lower than a threshold level, impedance of said IC device is maintained at a low state, and wherein, when a reset state is released, signal transmission from said antenna to said external apparatus is performed according to signals which are generated in said integrated circuit element by controlling a state of said impedance of said integrated circuit element.

8. An RFID comprising:
an integrated circuit element having memory means, logic processing means and power-on-reset means for releasing said logic processing means from a reset state which is an inactive state of said logic processing means and putting said logic circuit in an active state;

wherein, when a voltage applied to said power-on-reset means is lower than a threshold level, impedance of said integrated circuit element is maintained at a low state.

9. An RFID comprising:
an integrated circuit element having communication means, a logic circuit and power-on-reset means for releasing said logic circuit from a reset state which is an inactive state of said logic circuit and putting said logic circuit in an active state;

wherein, when a voltage applied to said power-on reset means is lower than a threshold level, impedance of said integrated circuit element is maintained at a low state, and wherein, when a reset state is released, signal transmission to an external apparatus is performed according to signals which are generated in said integrated circuit element by controlling a state of said impedance of said integrated circuit element.

10. An RFID comprising:
an integrated circuit element having communication means, a logic circuit and power-on-reset means for releasing said logic circuit from a reset state which is an inactive state of said logic circuit and putting said logic circuit in an active state; and an antenna for receiving power and signals from an external apparatus and for supplying said power and signals to said communication means and logic circuit;

wherein, when a voltage applied to said power-on-reset means is lower than a threshold level, impedance of said integrated circuit element is maintained at a low state, and wherein, when a reset state is released, signal transmission from said antenna to said external apparatus is performed according to signals which are generated in said integrated circuit element by repeating an operation that a terminal of a load resistor whose another terminal is connected with a terminal of a coil of said antenna is connected to ground potential through a switching element and an operation that said terminal of said load resistor is disconnected from said ground potential by said switching element.

11. An RFID comprising:
an integrated circuit element having communication means, a logic circuit and power-on-reset means for releasing said logic circuit from a reset state which is an inactive state of said logic circuit and putting said logic circuit in an active state; and an antenna for receiving power and signals from an external apparatus and for supplying said power and signals to said communication means and logic circuit)

wherein, when a voltage applied to said power-on-reset means is lower than a threshold level, a terminal of a load resistor whose another terminal is connected with a terminal of a coil of said antenna is connected to ground potential through a switching element.

12. An IC card which has the RFID according to claim 11.

* * * * *